(12) United States Patent
Nishikawa et al.

(10) Patent No.: US 9,971,200 B2
(45) Date of Patent: May 15, 2018

(54) LIQUID CRYSTAL DISPLAY DEVICE

(71) Applicant: Japan Display Inc., Tokyo (JP)

(72) Inventors: Masaki Nishikawa, Tokyo (JP); Tetsuya Ooshima, Tokyo (JP)

(73) Assignee: Japan Display Inc., Tokyo (JP)

( * ) Notice: Subject to any disclaimer, the term of this patent is extended or adjusted under 35 U.S.C. 154(b) by 59 days.

(21) Appl. No.: 14/982,912

(22) Filed: Dec. 29, 2015

(65) Prior Publication Data
US 2016/0187722 A1   Jun. 30, 2016

(30) Foreign Application Priority Data
Dec. 29, 2014   (JP) .................................. 2014-267007

(51) Int. Cl.
*G02F 1/1343* (2006.01)
*G02F 1/13363* (2006.01)

(52) U.S. Cl.
CPC .... *G02F 1/13363* (2013.01); *G02F 1/134309* (2013.01); *G02F 2001/134372* (2013.01); *G02F 2413/08* (2013.01)

(58) Field of Classification Search
CPC ........... G02F 1/13363; G02F 1/134309; G02F 2001/134372; G02F 2413/08
See application file for complete search history.

(56) References Cited

U.S. PATENT DOCUMENTS

| 2007/0132928 | A1* | 6/2007 | Yao | ................... G02F 1/133634 349/118 |
| 2008/0225209 | A1* | 9/2008 | Higa | ................. G02F 1/133555 349/96 |
| 2012/0019753 | A1* | 1/2012 | Mitsumoto | ......... G02F 1/13363 349/118 |

FOREIGN PATENT DOCUMENTS

| JP | H06-308497 A | 11/1994 |
| JP | H07-253578 A | 10/1995 |

* cited by examiner

*Primary Examiner* — Nathanael R Briggs
(74) *Attorney, Agent, or Firm* — Typha IP LLC

(57) ABSTRACT

In an FFS liquid crystal display device, viewing angle characteristics are further improved. In an FFS liquid crystal display device, the alignment axis of a first alignment film of a first substrate and the alignment axis of a second alignment film of a second substrate are directed in the same direction. At least two of an upper polarizer, a lower polarizer, or a retardation plate 160 satisfy conditions below. (1) The absorption axis of the upper polarizer forms an angle of one to 45 degrees inclusive with the alignment axis. (2) The absorption axis of the lower polarizer forms an angle of 91 to 135 degrees inclusive or forms an angle of 45 to 89 degrees inclusive with the alignment axis. (3) The extension axis of the retardation plate 160 forms an angle of one to 45 degrees inclusive with the alignment axis.

2 Claims, 13 Drawing Sheets z=3° y=93°

LIQUID CRYSTAL DISPLAY DEVICE

CLAIM OF PRIORITY

The present application claims priority from Japanese Patent Application JP 2014-267007 filed on Dec. 29, 2014, the content of which is hereby incorporated by reference into this application.

BACKGROUND OF THE INVENTION

(1) Field of the Invention

The present invention relates to a display device, and more specifically to a liquid crystal display device that improves viewing angle characteristics.

(2) Description of the Related Art

A liquid crystal display device includes a TFT substrate and a counter substrate. The TFT substrate is formed with a pixel having a pixel electrode, a thin film transistor (TFT), and other elements formed in a matrix configuration. The counter substrate is disposed opposite to the TFT substrate. A liquid crystal is sandwiched between the TFT substrate and the counter substrate. The light transmittance of liquid crystal molecules is controlled for each pixel to form images.

The liquid crystal has a problem of viewing angle characteristics. Japanese Unexamined Patent Application Publication No. 6(1993)-308497 describes a configuration of a twisted nematic (TN) liquid crystal display device in which regions where liquid crystal molecules have different pretilt angles are provided in a pixel for improving viewing angle characteristics. Japanese Unexamined Patent Application Publication No. 7(1994)-253578 describes a configuration of a TN liquid crystal display device in which regions where liquid crystal molecules have different pretilt angles are provided and pretilt angles are varied on a substrate on the upper side for improving viewing angle characteristics.

SUMMARY OF THE INVENTION

An In-plane switching (IPS) liquid crystal display device controls transmittances by rotating a liquid crystal with an electric field in parallel with a substrate, having excellent viewing angle characteristics more than the viewing angle characteristics of liquid crystal display devices in other modes. In IPS liquid crystal display devices, a fringe field switching (FFS) liquid crystal display device has excellent transmittances, and becomes a mainstream liquid crystal display device.

On the other hand, liquid crystal display devices are also used for medical monitors and monitors for other purposes. In such monitors, fine differences in color tones, for example, are sometimes important, and viewing angle characteristics are specifically important. In some cases, even typical FFS liquid crystal display devices fail to meet such demand.

It is an object of the present invention to achieve a practical use of a liquid crystal display device having more excellent viewing angle characteristics even in FFS liquid crystal display devices.

An aspect of the present invention is to solve the problems. Specific solutions are as follows.

(1) A liquid crystal display device includes a liquid crystal display panel, the panel including: a first substrate on which a comb tooth second electrode is formed on a flat first electrode through an insulating film and a first alignment film is formed on the first electrode; a second substrate formed with a second alignment film; and a liquid crystal sandwiched between the first substrate and the second substrate. In the panel, an alignment axis of the first alignment film and an alignment axis of the second alignment film are directed in the same direction. An upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image. In the liquid crystal display device, at least two of the upper polarizer, the lower polarizer, or the retardation plate satisfy any one of: a condition that an absorption axis of the upper polarizer forms an angle of one to 45 degrees inclusive with the alignment axis; a condition that an absorption axis of the lower polarizer forms an angle of 91 to 135 degrees inclusive or forms an angle of 45 to 89 degrees inclusive with the alignment axis; and a condition that an extension axis of the retardation plate forms an angle of one to 45 degrees inclusive with the alignment axis.

(2) A liquid crystal display device includes a liquid crystal display panel, the panel including: a first substrate on which a comb tooth second electrode is formed on a flat first electrode through an insulating film and a first alignment film is formed on the first electrode; a second substrate formed with a second alignment film; and a liquid crystal sandwiched between the first substrate and the second substrate. In the panel, an alignment axis of the first alignment film and an alignment axis of the second alignment film are directed in the same direction. An upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image. In the liquid crystal display device, at least two of the upper polarizer, the lower polarizer, or the retardation plate satisfy any one of: a condition that an absorption axis of the upper polarizer forms an angle of 91 to 135 degrees inclusive or forms an angle of 45 to 89 degrees inclusive with the alignment axis; a condition that an absorption axis of the lower polarizer forms an angle of one to 45 degrees inclusive with the alignment axis; and a condition that an extension axis of the retardation plate forms an angle of 91 to 135 degrees inclusive or forms an angle of 45 to 89 degrees inclusive with the alignment axis.

(3) In the liquid crystal display device according to (1) or (2), the retardation plate is disposed between the first substrate and the lower polarizer.

(4) A liquid crystal display device includes a liquid crystal display panel, the panel including: a first substrate on which a comb tooth second electrode is formed on a flat first electrode through an insulating film and a first alignment film is formed on the first electrode; a second substrate formed with a second alignment film; and a liquid crystal sandwiched between the first substrate and the second substrate. In the panel, an alignment axis of the first alignment film and an alignment axis of the second alignment film are directed in the same direction. An upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image. In the liquid crystal display device, an extension axis of the retardation plate is matched with the alignment axis. An equation y=ax+90 is satisfied, and a value of the a is 0.81 or more and 0.99 or less, where an angle formed by an absorption axis of the upper polarizer and the alignment axis is defined as x, and an angle formed by an absorption axis of the lower polarizer and the alignment axis is defined as y.

(5) A liquid crystal display device includes a liquid crystal display panel, the panel including: a first substrate on which a comb tooth second electrode is formed on a flat first electrode through an insulating film and a first alignment film is formed on the first electrode; a second substrate formed with a second alignment film; and a liquid crystal sandwiched between the first substrate and the second substrate. In the panel, an alignment axis of the first alignment film and an alignment axis of the second alignment film are directed in the same direction. An upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image. In the liquid crystal display device, an absorption axis of the lower polarizer forms an angle of 90 degrees with the alignment axis. An equation z=bx is satisfied, and the b is 0.45 or more and 0.55 or less, where an angle formed by an absorption axis of the upper polarizer and the alignment axis is defined as x, and an angle formed by an extension axis of the retardation plate and the alignment axis is defined as z.

(6) A liquid crystal display device includes a liquid crystal display panel, the panel including: a first substrate on which a comb tooth second electrode is formed on a flat first electrode through an insulating film and a first alignment film is formed on the first electrode; a second substrate formed with a second alignment film; and a liquid crystal sandwiched between the first substrate and the second substrate. In the panel, an alignment axis of the first alignment film and an alignment axis of the second alignment film are directed in the same direction. An upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image. In the liquid crystal display device, an absorption axis of the upper polarizer is matched with the alignment axis. An equation z=c(y−90) is satisfied, and the c is 0.45 or more and 0.55 or less, where an angle formed by an absorption axis of the lower polarizer and the alignment axis is defined as y, and an angle formed by an extension axis of the retardation plate and the alignment axis is defined as z.

(7) In the liquid crystal display device according to any one of (4) to (6), the retardation plate is disposed between the first substrate and the lower polarizer.

DETAILED DESCRIPTION OF THE PREFERRED EMBODIMENTS

In the following, embodiments of the present invention will be described in detail.

First Embodiment

Figure 1:
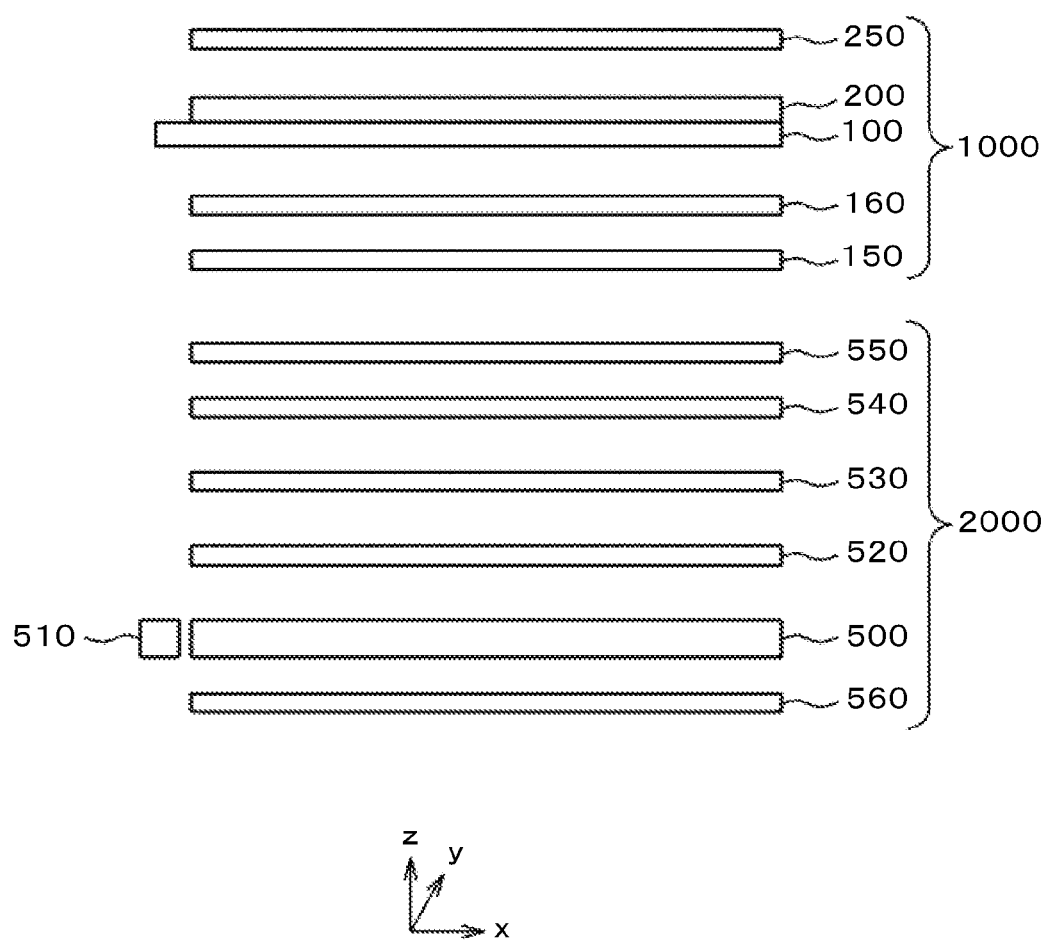
FIG. 1 is an exploded cross sectional view of a liquid crystal display device to which an embodiment of the present invention is adapted.

FIG. 1 is an exploded cross sectional view of a liquid crystal display device. In FIG. 1, to a TFT substrate 100, a counter substrate 200 is attached in the edge area with a sealing material. A liquid crystal is sandwiched between the TFT substrate 100 and the counter substrate 200. A retardation plate 160 is attached on the lower side of the TFT substrate 100. A lower polarizer 150 is attached on the lower side of the retardation plate 160. An upper polarizer 250 is attached on the upper side of the counter substrate 200. Light from a backlight 2000 is converted into linear polarized light at the lower polarizer 150. The polarization axis of the polarized light is changed at the retardation plate 160 to improve the viewing angle characteristics. The TFT substrate 100, the counter substrate 200, the retardation plate 160, the lower polarizer 150, and the upper polarizer 250 are referred to as a liquid crystal display panel 1000. In the following embodiment, the retardation plate 160 is disposed between the TFT substrate 100 and the lower polarizer 150. The embodiment of the present invention is also applicable to the case in which the retardation plate 160 is disposed between the counter substrate 200 and the upper polarizer 250.

The backlight 2000 is disposed below the lower polarizer 150 of the liquid crystal display panel 1000. The backlight 2000 has a structure in which a light source 510 is disposed at the side of a light guide plate 500 and light from the light source 510 is entered to the light guide plate 500 and guided to the liquid crystal display panel 1000. On the light guide plate 500, a diffusion film 520 is disposed. The diffusion film 520 is responsible for reducing the luminance variation of light emitted from the light guide plate 500 toward the liquid crystal display panel 1000. On the diffusion film 520, a lower prism sheet 530 is disposed, and on the lower prism sheet 530, an upper prism sheet 540 is disposed. On the upper prism sheet 540, an upper diffuser 550 is disposed for preventing the production of moire caused by the interference of the lower and upper prism sheets 530 and 540 with the picture signal line or the scanning line of the liquid crystal display panel.

On the lower prism sheet 530, line prisms are formed at a pitch of about 50 micrometers in the x-axis direction in FIG. 1, for example. On the upper prism sheet 540, line prisms are formed at a pitch of about 50 micrometers in the y-axis direction in FIG. 1, for example. The normal direction of a plane formed by the x-axis and the y-axis is the z-axis direction. The backlight and the liquid crystal display panel are disposed in the z-axis direction. Both of the lower and upper prism sheets 530 and 540 are responsible for guiding light shifted from the normal direction of the liquid crystal display panel 1000 to go to the normal direction of the liquid crystal display panel 1000 and thus improving the efficiency of the backlight 2000.

Figure 2:
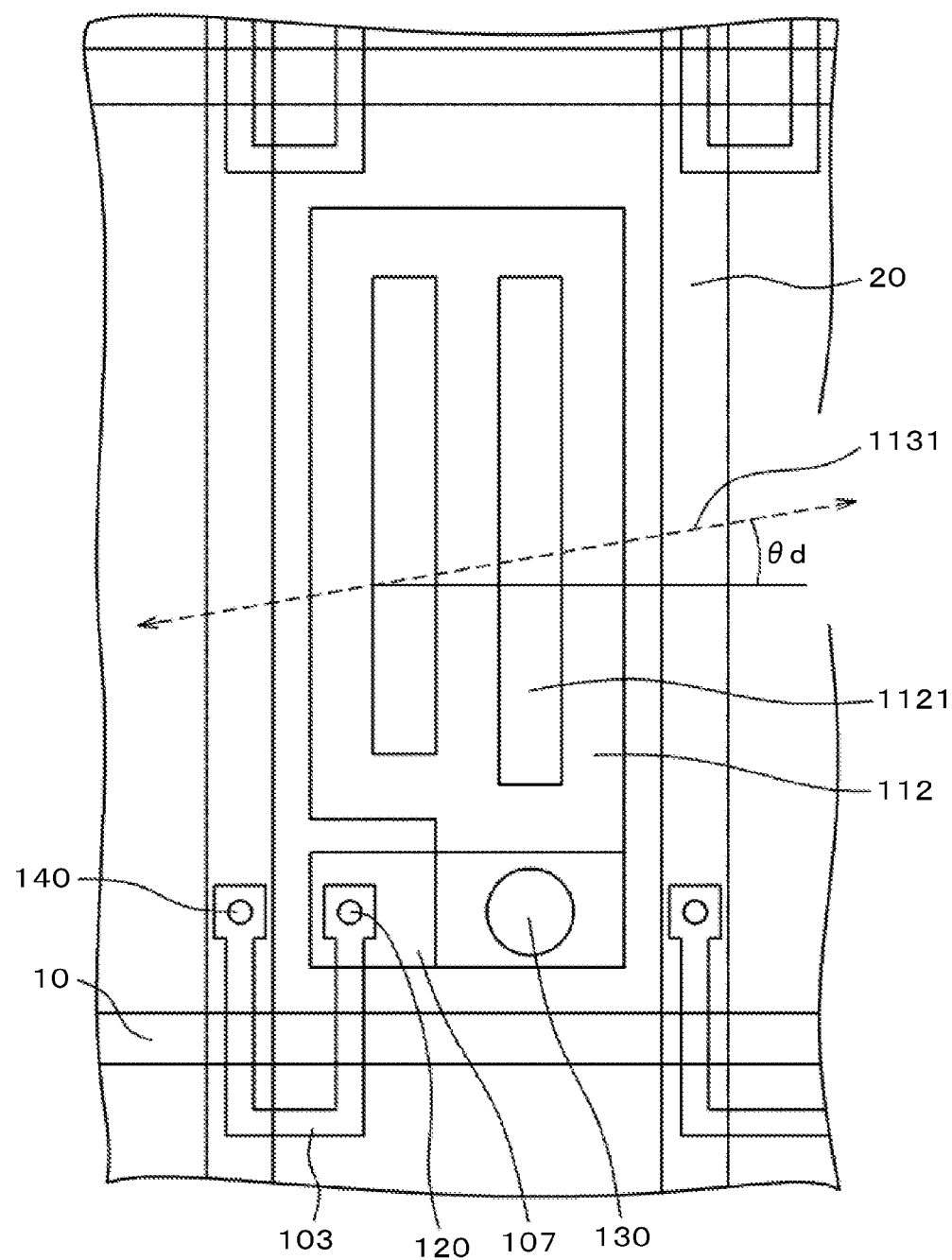
FIG. 2 is a plan view of the pixel portion of an FFS liquid crystal display device.

FIG. 2 is a plan view of the pixel portion of an FFS liquid crystal display device. In FIG. 2, scanning lines 10 are extended in the lateral direction, e.g. the y-axis direction in FIG. 1, and arrayed in the vertical direction. Picture signal lines 20 are extended in the vertical direction, e.g. the X-direction in FIG. 1, and arrayed in the lateral direction. A pixel electrode 112 is formed on a region surrounded by the scanning line 10 and the picture signal line 20.

In FIG. 2, a configuration is formed in which a semiconductor layer 103 is extended in a U-shape from a through hole 140 and crossed twice below the scanning line 10. The portion at which the semiconductor layer 103 is crossed with the scanning line 10 is the channel region of a TFT. In other words, on this portion, the scanning line 10 is a gate electrode. The semiconductor layer 103 is connected to a contact electrode 107 in a through hole 120. The contact electrode 107 is connected to a pixel electrode 112 in a through hole 130. The pixel electrode 112 is a comb tooth electrode having a slit 1121 inside the pixel electrode 112. In FIG. 2, the pixel electrode 112 is formed in a plurality of comb tooth electrodes (line electrodes) with slits. However, the pixel electrode 112 is possibly a single comb tooth electrode (a line electrode) with no slit.

A dotted arrow illustrated in FIG. 2 expresses the direction of an alignment axis 1131 of an alignment film 113 for determining the orientation of initial alignment of the liquid crystal, described later. The direction of the alignment axis 1131 is directed in the same direction on the TFT substrate 100 and the counter substrate 200. The orientation of the alignment axis 1131 is different at an angle of 90 degrees between the case in which the dielectric anisotropy $\Delta\in$ of the liquid crystal is negative and the case in which the dielectric anisotropy $\Delta\in$ is positive. FIG. 2 is the case of the negative dielectric anisotropy $\Delta\in$. However, the embodiment of the present invention is also similarly applicable to the case of the positive dielectric anisotropy $\Delta\in$. In FIG. 2, the direction of the alignment axis is shifted by θd from the horizontal direction (the y-axis direction) in order to stabilize the liquid crystal.

Figure 3:
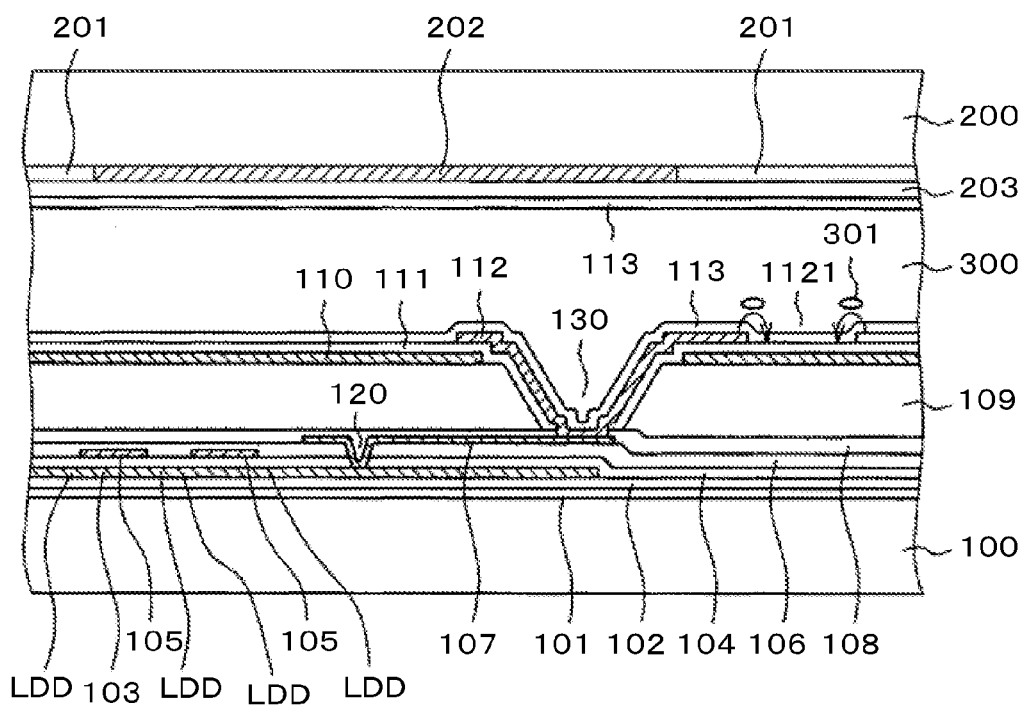
FIG. 3 is a cross sectional view of the pixel portion of the FFS liquid crystal display device.

FIG. 3 is a cross sectional view of the pixel portion. The TFT in FIG. 3 is a so-called top gate TFT. A low temperature polysilicon (LTPS) is used for the semiconductor. In FIG. 3, on the glass TFT substrate 100, a first base film 101 made of SiN, and a second base film 102 made of $SiO_2$ are formed by chemical vapor deposition (CVD). The first and second base films 101 and 102 are responsible for preventing impurities derived from the glass substrate 100 from contaminating the semiconductor layer 103.

On the second base film 102, the semiconductor layer 103 is formed. An amorphous silicon (a-Si) film is formed on the second base film 102 by CVD, and the formed a-Si film is annealed by laser, and then converted into a polysilicon (poly-Si) film. The poly-Si film is patterned by photolithography. This is the semiconductor layer 103.

On the semiconductor film 103, a gate insulating film 104 is formed. The gate insulating film 104 is an $SiO_2$ film made of tetraethoxysilane (TEOS). This film is also formed by CVD. On the gate insulating film 104, a gate electrode 105 is formed. The scanning line 10 illustrated in FIG. 2 also serves as the gate electrode 105. The semiconductor layer 103 is crossed twice below the scanning line 10. Thus, in FIG. 3, two gate electrodes 105 are disposed. The gate electrode 105 is made of a MoW film, for example.

The gate electrode 105 is patterned by photolithography. In this patterning, an impurity, such as phosphorus or boron, is doped to the poly-Si layer by ion implantation, and then a source S or a drain D is formed on the poly-Si layer. Using the photoresist in patterning the gate electrode 105, a lightly doped drain (LDD) layer is formed between the channel layer of the poly-Si layer and the source S or the drain D for preventing a local increase in field intensity.

After the formation, a first interlayer insulating film 106 is formed of $SiO_2$ and covers the gate electrode 105. The first interlayer insulating film 106 insulates the gate electrode 105 from the contact electrode 107. On the first interlayer insulating film 106 and the gate insulating film 104, the through hole 120 is formed for connecting the semiconductor layer 103 to the contact electrode 107. The through hole 120 is formed on the first interlayer insulating film 106 and the gate insulating film 104 simultaneously by photolithography.

On the first interlayer insulating film 106, the picture signal line 20 is formed. In the through hole 140 illustrated in FIG. 2, the picture signal line is connected to the semiconductor layer 103. In other words, two TFTs are formed between the through hole 140 and the through hole 120. On the first interlayer insulating film 106, the contact electrode 107 and the picture signal line 20 are formed on the same layer. The picture signal line 20 and the contact electrode 107 are made of MoW, for example.

An inorganic passivation film 108 is made of SiN or other compounds and covers the picture signal line 20 and the contact electrode 107 for protecting the entire TFT. The inorganic passivation film 108 is formed by CVD similarly to the first base film 101. An organic passivation film 109 is formed to cover the inorganic passivation film 108. The organic passivation film 109 is made of a photosensitive acrylic resin. In addition to acrylic resins, the organic passivation film 109 can also be made of silicone resin, epoxy resin, polyimide resin, and other resins. Since the organic passivation film 109 functions as a planarization film, the organic passivation film 109 is thickly formed. The film thickness of the organic passivation film 109 is in a range of one to four micrometers. In many cases, the film thickness is about two micrometers. In some cases, the organic passivation film 109 is provided, and the inorganic passivation film 108 is not provided.

In order to provide electrical conductivity between the pixel electrode 112 and the contact electrode 107, the through hole 130 is formed on the inorganic passivation film 108 and the organic passivation film 109. A photosensitive resin is used for the organic passivation film 109. After coating a photosensitive resin, the resin is exposed, and then only a portion exposed to light is dissolved in a certain developer. In other words, the use of a photosensitive resin can omit the formation of a photoresist. After the through hole 130 is formed on the organic passivation film 109, the organic passivation film is baked at a temperature of about 230° C., and then the organic passivation film 109 is completed.

After the completion, ITO (Indium Tin Oxide) to be a common electrode 110 is formed by sputtering, and then the ITO is patterned so that the ITO is removed from the through hole 130 and around the through hole 130. The common electrode 110 can be formed flatly and commonly on the pixels. After the formation, SiN to be a second interlayer insulating film 111 is formed throughout the surface by CVD. After the formation, in the through hole 130, a through hole to provide electrical conduction between the contact electrode 107 and the pixel electrode 112 is formed on the second interlayer insulating film 111 and the inorganic passivation film 108.

After the formation, ITO is formed by sputtering, and then patterned to form the pixel electrode 112. The planar shape of the pixel electrode 112 is as illustrated in FIG. 3. An alignment film material is coated on the pixel electrode 112 by flexographic printing, ink jet, or other methods, and then baked to form an alignment film 113. For the alignment process of the alignment film 113, rubbing as well as photo-alignment with polarized ultraviolet rays are used. The orientation of the alignment axis after the alignment process is as illustrated in FIG. 2.

A voltage is applied to the pixel electrode 112 and the common electrode 110, and then electric flux lines as illustrated in FIG. 3 are produced. Liquid crystal molecules 301 are rotated with this electric field, the quantity of light transmitted through a liquid crystal layer 300 is controlled for each pixel, and then images are formed.

In FIG. 3, the counter substrate 200 is disposed as the liquid crystal layer 300 is sandwiched. On the inner side of the counter substrate 200, a color filter 201 is formed. For the color filter 201, red, green, and blue color filters are formed for each pixel, and color images are formed with the color filters. A black matrix 202 is formed between the color filters 201 for improving image contrast. The black matrix 202 also functions as the light shielding film of the TFT for preventing a photocurrent from being carried through the TFT.

An overcoat film 203 is formed to cover the color filter 201 and the black matrix 202. Since the surfaces of the color filter 201 and the black matrix 202 are rough, these surfaces are flattened with the overcoat film 203. On the overcoat film, an alignment film 113 is formed for determining the initial alignment of the liquid crystal. Similarly to the alignment film 113 of the TFT substrate 100, rubbing or photo-alignment is used for the alignment process of the alignment film 113. Similarly to the alignment axis of the TFT substrate 100, the direction of the alignment axis 1131 is the orientation of the arrow in FIG. 2.

Figure 4:
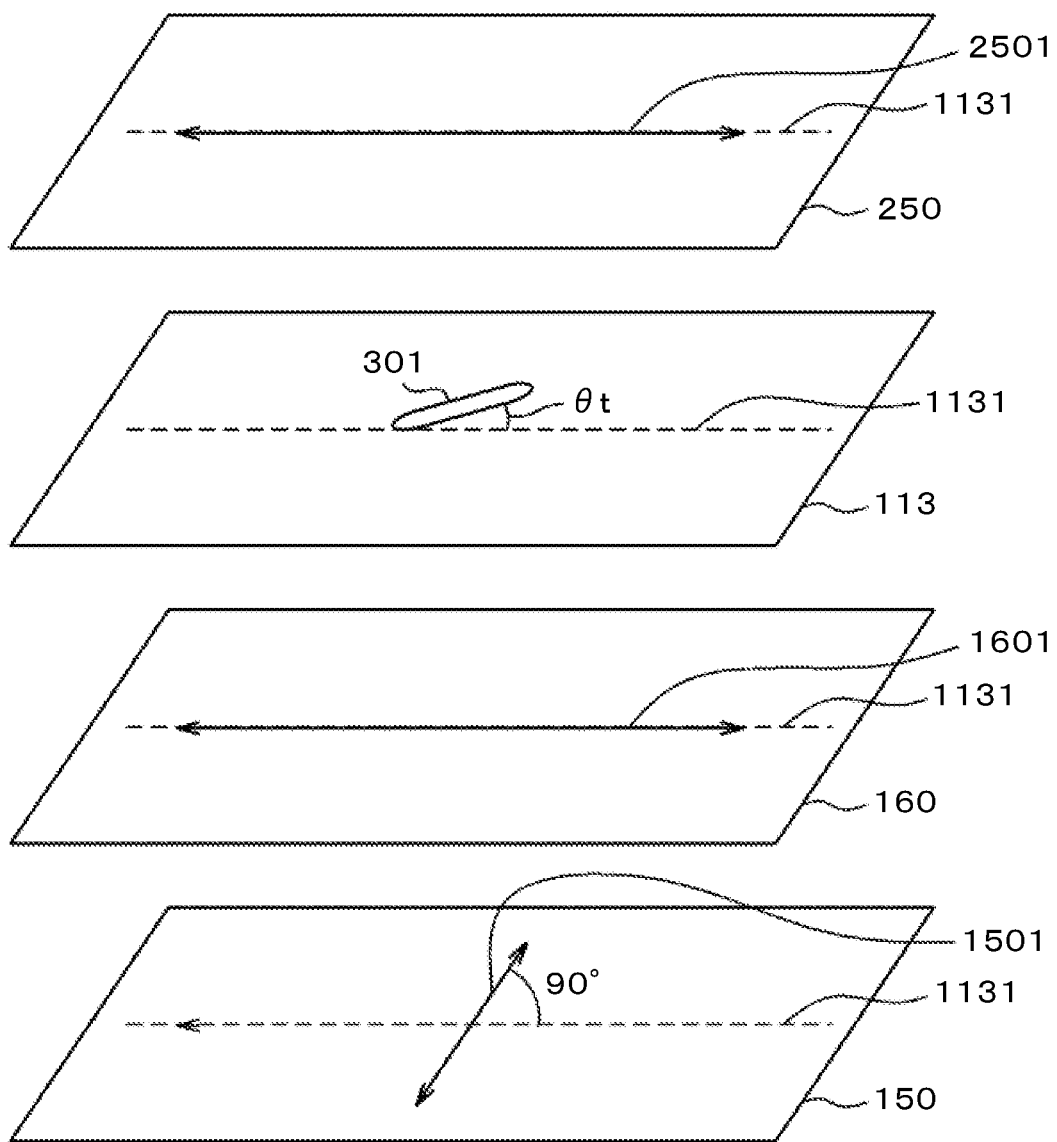
FIG. 4 is an exploded perspective view of the reference directions of the alignment axis of an alignment film, the absorption axis of a lower polarizer, the absorption axis of an upper polarizer, and the extension axis of a retardation plate.

FIG. 4 is a schematic diagram of an absorption axis 1501 of the lower polarizer 150, the direction of an extension axis 1601 of the retardation plate 160, the direction of the alignment axis 1131 of the alignment film 113 that determines the direction of the initial alignment of the liquid crystal, and other elements in the typical configuration of the liquid crystal display panel 1000 in FIG. 1. FIG. 4 is the case of a so-called e-mode liquid crystal display device. In FIG. 4, the alignment axis 1131 of the liquid crystal is depicted by a dotted line. The angles of the absorption axis 2501 of the upper polarizer 250, the absorption axis 1501 of the lower polarizer 150, the extension axis 1601 of the retardation plate 160, and the other elements are based on the alignment axis 1131 of the liquid crystal.

In FIG. 4, the absorption axis 1501 of the lower polarizer 150 is directed in the direction at an angle of 90 degrees to the alignment axis 1131 of the liquid crystal. The absorption axis of the polarizer means that light vibrating in this direction is absorbed. The direction of the extension axis 1601 of the retardation plate 160 is the same as the direction of the alignment axis 1131 of the liquid crystal. The direction of the extension axis 1601 of the retardation plate 160 is ne that is the direction in which the refractive index is large. The direction at the right angle to the extension axis 1601 is no that is the direction in which the refractive index is small.

The alignment film 113 is formed on the TFT substrate 100 and on the counter substrate 100. The alignment axes 1131 are directed in the same direction. Therefore, in the following, the alignment axis 1131 of the alignment film 113 formed on the TFT substrate 100 and the alignment axis 1131 of the alignment film 113 formed on the counter substrate 200 are simply referred to as the alignment axis 1131. The alignment axis 1131 is sometimes referred to as the alignment axis 1131 of the liquid crystal. In FIG. 2, the alignment axis 1131 is tilted by θd from the horizontal direction. However, in FIG. 4, the alignment axis 1131 is directed in the horizontal direction, which means the reference direction. In FIG. 4, the tilt angle of the liquid crystal molecule 301 is an angle of two degrees. This is an example in the case in which the alignment film 113 is rubbed. The absorption axis 2501 of the upper polarizer 250 disposed on the alignment film 113 is directed similarly to the alignment axis 1131 of the liquid crystal. In FIG. 4, a phase difference Δn to light caused by the liquid crystal layer is 383 nm. The front phase difference of the retardation plate 160 is 180 nm, and the phase difference (Rth) in the thickness direction is 54 nm. In the case of the rubbing process, the alignment characteristics of the liquid crystal are varied according to the direction of rubbing the alignment film with a rubbing cloth. In the present application, the rubbing direction can be appropriately changed.

Typically, even a slight displacement of the angles of the absorption axis 2501 of the upper polarizer 250, the absorption axis 1501 of the lower polarizer 150, and the extension axis 1601 of the retardation plate 160 from angles as illustrated in FIG. 4 increases the black luminance, i.e., reduces the contrast. Thus, variations in the angles of the absorption axis 2501 of the upper polarizer 250, the absorption axis 1501 of the lower polarizer 150, and the extension axis 1601 of the retardation plate 160 are controlled so that variations fall on considerably smaller values than an angle of one degree from the value illustrated in FIG. 4.

The configuration described above is the case in which the operation mode is a so-called e-mode. The embodiment of the present invention is also similarly applicable to the case in which the operation mode is a so-called o-mode. In the case of the o-mode, a concept is that the absorption axis 2501 of the upper polarizer 250 and the extension axis 1601 of the retardation plate 160 form an angle of 90 degrees with the direction of the alignment axis 1131, and the direction of the absorption axis 1501 of the lower polarizer 150 is the same as the direction of the alignment axis 1131.

Figure 5:
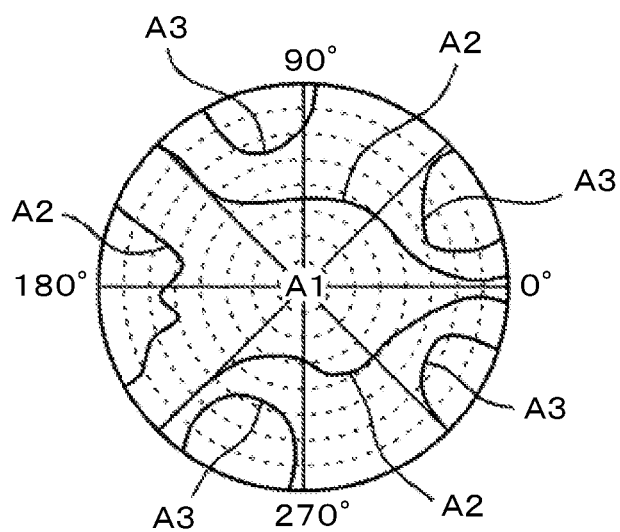
FIG. 5 is a chart of an example of viewing angle characteristics in the configuration in FIG. 4.

Typically, in the case of the FFS mode, the viewing angle characteristics are excellent, and thus, the luminance variation is also small. However, in detail observation on the screen, viewing angle characteristics as illustrated in FIG. 5 are produced. FIG. 5 is a chart of viewing angle characteristics expressed by contour lines in the case of black display. In other words, even in black display, the luminance is shown as illustrated in FIG. 5 depending on angles to view the screen. In FIG. 5, angles expressed around the circle are azimuth angles. Dotted concentric circles in FIG. 5 express angles from the normal of the screen in the direction in which the screen is viewed. In other words, the center circle depicts the case in which the screen is viewed on the normal. The dotted concentric circles depict angles each tilted at an angle of ten degrees from the normal direction of the screen. In FIG. 5, the luminance is increased in order of luminances A1, A2, and A3. In FIG. 5, the luminance is changed from the luminances A1 to A3 depending on the positions to view the screen. In other words, the luminance in black display is changed depending on the positions to view the screen.

In the concept of contrast, the black level also becomes a problem in the case in which the screen is viewed from the normal direction. In other words, in order to reduce the black level (in the following, referred to as the black luminance) as much as possible, it is thought that the best configuration is the configuration as illustrated in FIG. 4. On the other hand, the viewing angle characteristics in black display in this case are as illustrated in FIG. 5. The viewing angle characteristics possibly lead to a problem depending on purposes or user favorites. In the embodiment of the present invention, at least two of the angle of the absorption axis 2501 of the upper polarizer 250, the angle of the absorption axis 1501 of the lower upper polarizer 150, and the angle of the extension axis 1601 of the retardation plate 160 are changed from the state in FIG. 4. Thus, an increase in the black luminance is to be reduced to a predetermined value or less, and the viewing angle characteristics in black display are to be improved.

Figure 6:
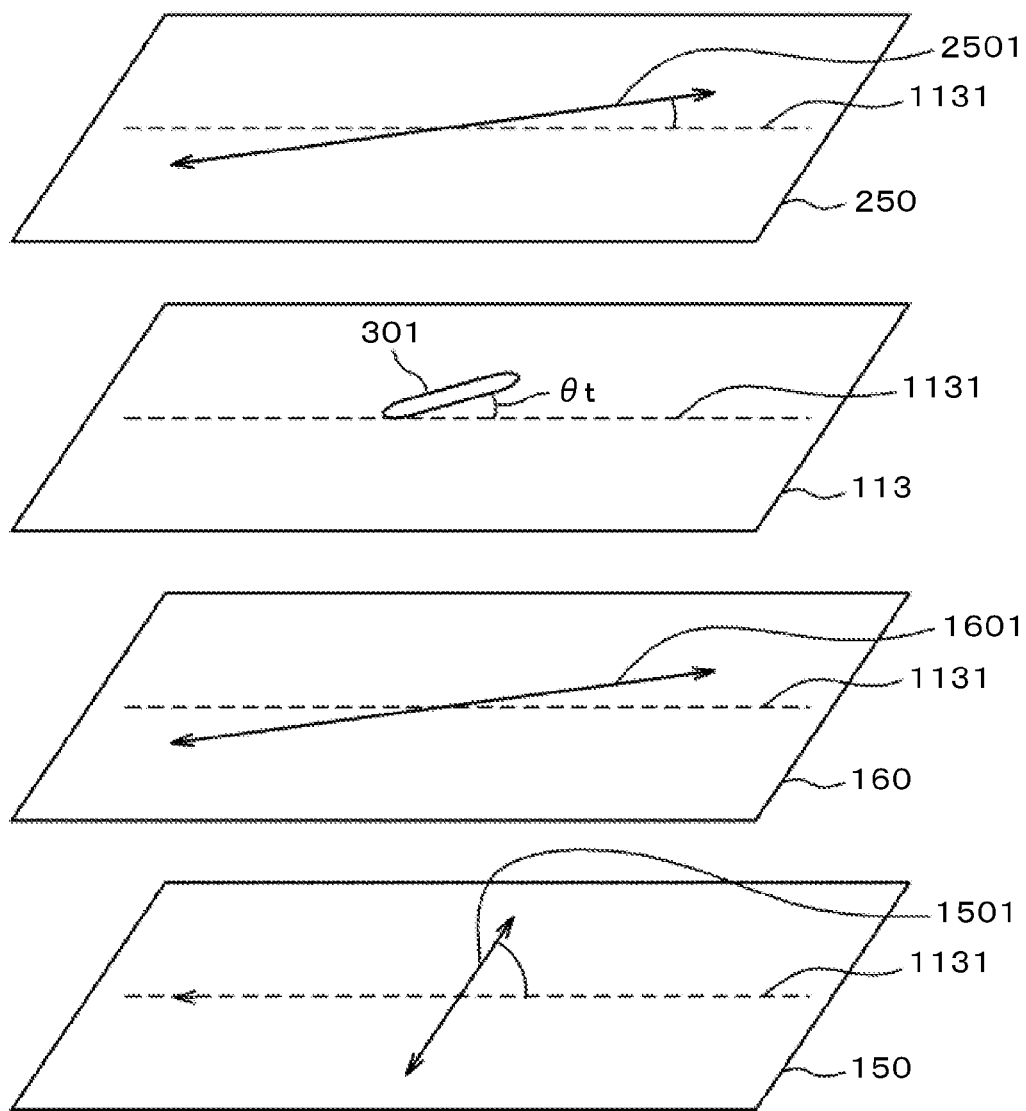
FIG. 6 is an exploded perspective view of the rotation directions of the absorption axis of the lower polarizer, the absorption axis of the upper polarizer, and the extension axis of the retardation plate with respect to the alignment axis of the alignment film.

FIG. 6 is a schematic diagram for explaining the configuration of the embodiment of the present invention. In FIG. 6, the alignment axis 1131 of the liquid crystal between the TFT substrate 100 and the counter substrate 200 is depicted by a dotted line in the horizontal direction for the reference direction. In FIG. 6, an angle formed by the absorption axis 1501 of the lower polarizer 150 and the alignment axis 1131 is defined as y. In other words, this shows that y is not necessarily an angle of 90 degrees and y is sometimes shifted by a predetermined angle from an angle of 90 degrees. An angle formed by the extension axis 1601 of the retardation plate 160 and the alignment axis 1131 is defined as z. The alignment axis 1131 of the alignment film 113 is similar to the alignment axis 1131 in FIG. 4. An angle formed by the absorption axis 2501 of the upper polarizer 250 and the alignment axis 1131 is defined as x. In FIG. 6, a phase difference Δn to light caused by the liquid crystal layer is 383 nm. The front phase difference of the retardation plate 160 is 180 nm, and the phase difference (Rth) in the thickness direction is 54 nm.

Figure 7:
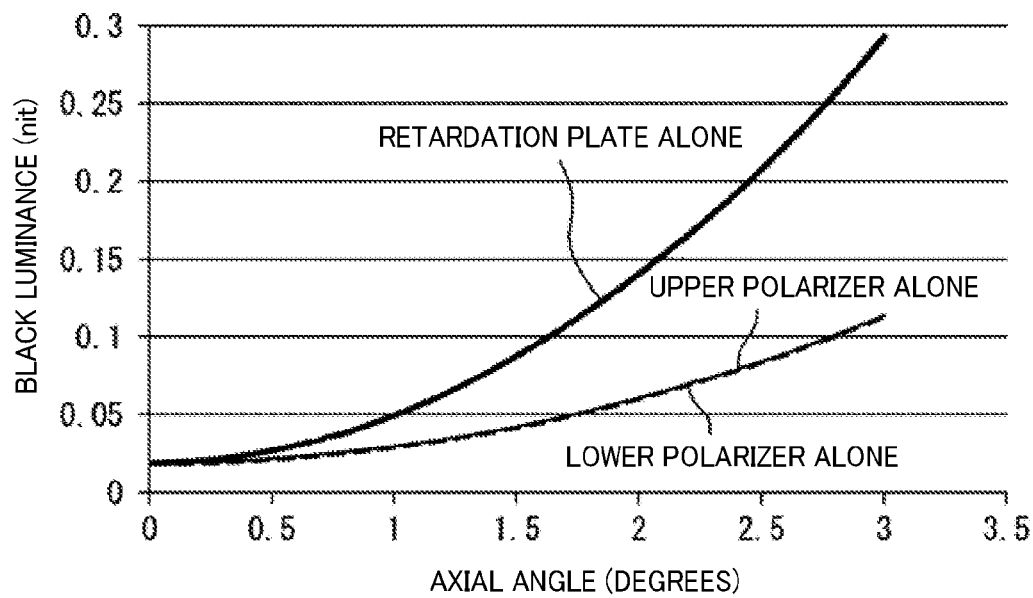
FIG. 7 is a graph of changes in the black luminance in the case in which the absorption axis of the lower polarizer, the absorption axis of the upper polarizer, and the extension axis of the retardation plate are rotated separately.

FIG. 7 is a graph of the black level in the normal direction of the screen, i.e., a change in the black luminance in order to improve the viewing angle characteristics in the case in which any one of the absorption axis 2501 of the upper polarizer 250, the extension axis 1601 of the retardation plate 160, and the absorption axis 1501 of the lower polarizer 150 is shifted from the reference angle illustrated in FIG. 4. The vertical axis in FIG. 7 expresses the black luminance, and the unit is nit (cd/m$^2$). In the case of the upper polarizer 250, the horizontal axis expresses an angle formed by the absorption axis 2501 and the alignment axis 1131, i.e., x in FIG. 6. In the case of the retardation plate 160, the horizontal axis expresses an angle formed by the extension axis 1601 and the alignment axis 1131, i.e., z in FIG. 6. In the case of the lower polarizer 150, the horizontal axis expresses an angle formed by the alignment axis 1501 and the alignment axis 1131, i.e., y in FIG. 6.

Figure 8:
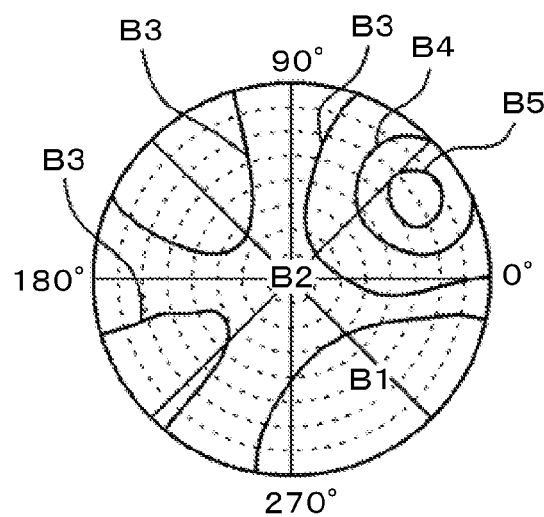
FIG. 8 is a chart of viewing angle characteristics in the case in which the absorption axis of the upper polarizer alone is rotated at an angle of three degrees from the reference direction.

In FIG. 7, the absorption axis 2501 of the upper polarizer 250 is shifted from the reference angle, i.e., the direction of the alignment axis 1131 of the liquid crystal, and then the black luminance is increased. However, in this case in which the absorption axis 2501 of the upper polarizer 250 is shifted at an angle of three degrees, the black luminance is increased to about 0.11 nit. In this case, the extension axis 1601 of the retardation plate 160 and the absorption axis 1501 of the lower polarizer 150 remain at the reference angles. The viewing angle characteristics when the upper polarizer 2501 is shifted by an angle of three degrees from the reference angle are as illustrated in FIG. 8. FIG. 8 shows that the luminance is increased in order of luminances B1, B2, and B3. The viewing angle characteristics illustrated in FIG. 8 do not show much improvement as compared with the viewing angle characteristics in FIG. 5, which are conventional ones.

As illustrated in FIG. 7, depending on the angles of the absorption axis 2501 of the upper polarizer 250, the absorption axis 1501 of the lower polarizer 150, and the extension axis 1601 of the retardation plate 160, the black luminance to be reference is varied among the cases. Therefore, in charts expressing viewing angle characteristics shown below, which similarly express viewing angle characteristics as in FIG. 8, the reference luminance is varied depending on the cases. Thus, the values of the contour lines are different in the charts. For example, in FIG. 5, the luminances expressed by the contour lines are the luminances A1, A2, and A3. In FIG. 8, the luminances expressed by the contour lines are the luminances B1, B2, and B3. This is also applied to the similar charts below.

Figure 9:
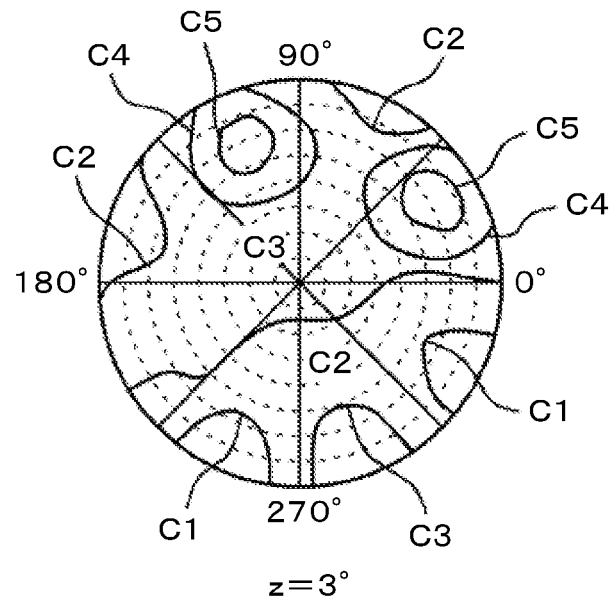
FIG. 9 is a chart of viewing angle characteristics in the case in which the extension axis of the retardation plate alone is rotated at an angle of three degrees from the reference direction.

In FIG. 7, the extension axis 1601 of the retardation plate 160 is shifted from the reference angle, i.e., the direction of the alignment axis 1131 of the liquid crystal, and then the black luminance is increased. However, in the case in which the upper polarizer 2501 is shifted at an angle of three degrees, the black luminance is increased by about 0.3 nit. In this case, the absorption axis 2501 of the upper polarizer 250 and the absorption axis 1501 of the lower polarizer 150 remain at the reference angles. On the other hand, the viewing angle characteristics in this case are as illustrated in FIG. 9, showing that the luminance is increased in order of luminances C1, C2, C3, C4, and C5.

Figure 10:
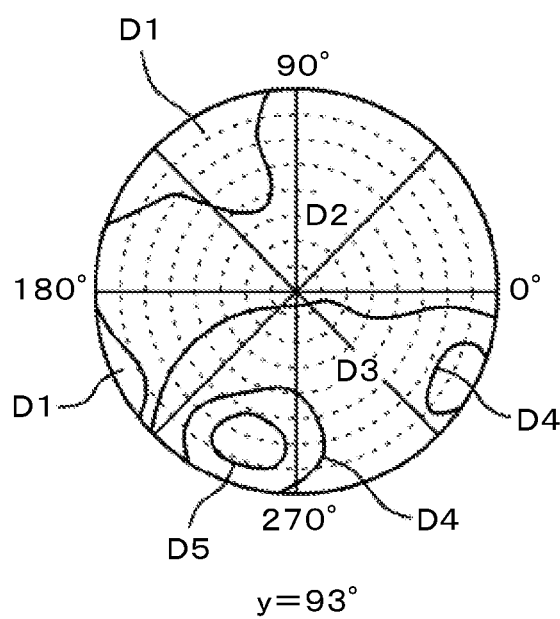
FIG. 10 is a chart of viewing angle characteristics in the case in which the absorption axis of the lower polarizer alone is rotated at an angle of three degrees from the reference direction.

In FIG. 7, the lower polarizer 150 is shifted from the reference angle, i.e., the direction of the alignment axis 1131 of the liquid crystal, and then the black luminance is increased. However, in the case in which the upper polarizer 2501 is shifted at an angle of three degrees, the black luminance is increased to about 0.11 nit. In this case, the extension axis 1601 of the retardation plate 160 and the absorption axis 2501 of the upper polarizer 250 remain at the reference angles. On the other hand, the viewing angle characteristics in this case are as illustrated in FIG. 10, showing that the luminance is increased in order of luminances D1, D2, D3, D4, and D5.

As described above, even though only any one of the upper polarizer 250, the retardation plate 160, and the lower polarizer 150 is shifted from the reference angle, the black luminance is sometimes increased.

On the other hand, at least two of the absorption axis 2501 of the upper polarizer 250, the extension axis 1601 of the retardation plate 160, and the absorption axis 1501 of the lower polarizer 150 are shifted together from the reference direction. Thus, an increase in the black luminance can be reduced, and the viewing angle characteristics can be improved. An aspect of the embodiment of the present invention is to tilt at least two of the polarization axis 2501 of the upper polarizer 250, the polarization axis 1501 of the lower polarizer 150, and the extension axis 1601 of the retardation plate 160 at an angle of one to 45 degrees inclusive from the direction illustrated in FIG. 4. In the case in which at least two of the absorption axis 2501 of the upper polarizer 250, the extension axis 1601 of the retardation plate 160, and the absorption axis 1501 of the lower polarizer 150 are shifted from the reference direction, a problem is how to shift the axes.

Figure 11:
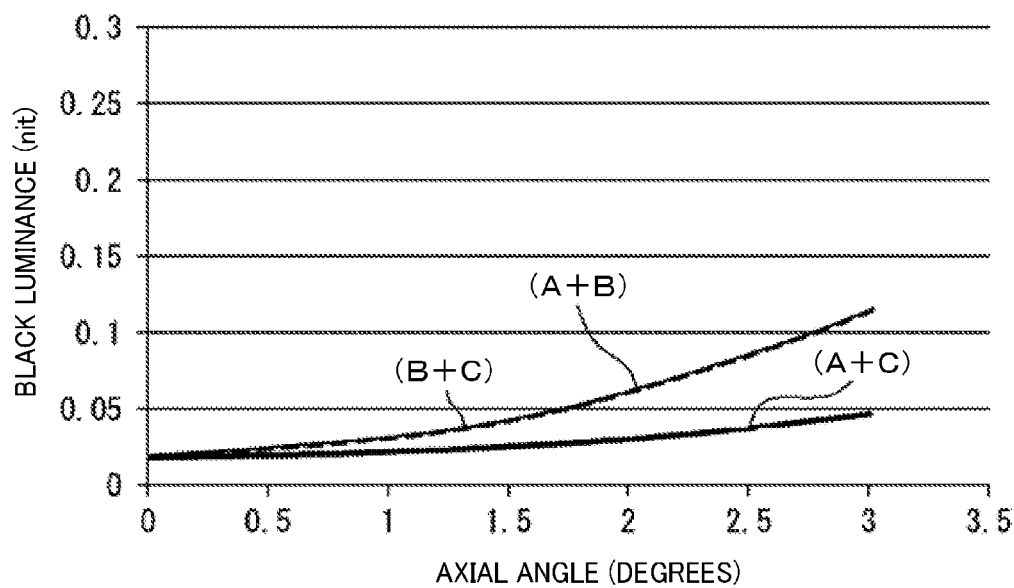
FIG. 11 is a graph of changes in the black luminance in the case in which any two of the absorption axis of the upper polarizer, the absorption axis of the lower polarizer, and the extension axis of the retardation plate are rotated together.

FIG. 11 is a diagram of the case in which two elements are shifted in the same ratio in order not to increase the black luminance when at least two of the absorption axis 2501 of the upper polarizer 250, the extension axis 1601 of the retardation plate 160, and the absorption axis 1501 of the lower polarizer 150 are shifted from the reference direction. This shows the case in which, for example, the absorption axis 2501 of the upper polarizer 250 is shifted at an angle of one degree as well as the absorption axis 1501 of the lower polarizer 150 is shifted at an angle of one degree.

In FIG. 11, the expression (A+C) is a change in the black luminance in the case in which the angle of the extension axis 1601 of the retardation plate 160 is maintained at the reference angle and the angles of the absorption axis 2501 of the upper polarizer 250 and the absorption axis 1501 of the lower polarizer 150 are shifted from the reference angles. The expression (A+B) is a change in the black luminance in the case in which the absorption axis 1501 of the lower polarizer 150 is maintained at the reference angle and the angles of the absorption axis 2501 of the upper polarizer 250 and the extension axis 1601 of the retardation plate 160 are shifted from the reference angles. The expression (B+C) is a change in the black luminance in the case in which the angle of the absorption axis 2501 of the upper polarizer 250 is maintained at the reference position and the angles of the extension axis 1601 of the retardation plate 160 and the absorption axis 1501 of the lower polarizer 150 are shifted from the reference positions.

In FIG. 11, the expression (A+C), i.e., a change in the black luminance in the case in which the angle of the extension axis 1601 of the retardation plate 160 is maintained at the reference angle and the angles of the absorption axis 2501 of the upper polarizer 250 and the absorption axis 1501 of the lower polarizer 150 are shifted from the reference angles is greatly smaller than in the case in which only the axis of one of the upper polarizer 250, the retardation plate 160, and the lower polarizer 150 is shifted illustrated in FIG. 7. On the other hand, the case of the expressions (A+B) and (B+C) in FIG. 11 are almost equal to the case in which only the axis of one of the upper polarizer 250 and the lower polarizer 150 is shifted illustrated in FIG. 7.

Another aspect of the embodiment of the present invention is to shift two axes by different amounts in order to prevent an increase in the black luminance in shifting at least two of the absorption axis 2501 of the upper polarizer 250, the extension axis 1601 of the retardation plate 160, and the absorption axis 1501 of the lower polarizer 150 from the reference direction.

Figure 12:
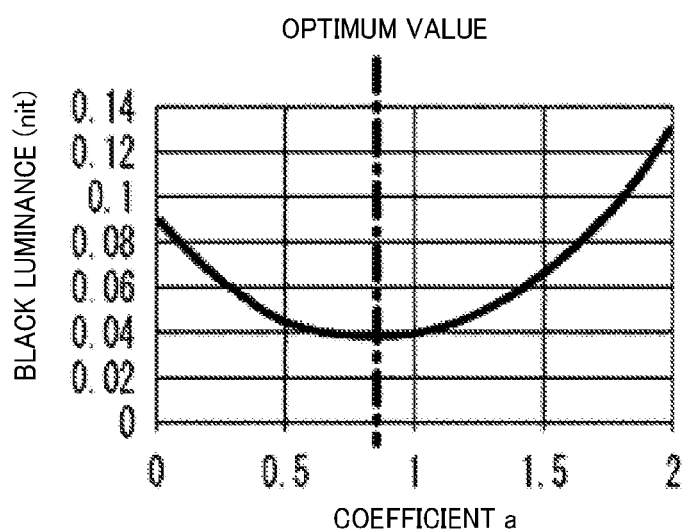
FIG. 12 is a graph of determining the optimum value for coefficient a in the case in which the angle of the absorption axis of the upper polarizer is defined as x, the angle of the absorption axis of the lower polarizer is defined as y, and the upper and lower polarizers are rotated together in an equation y=ax+90.

FIG. 12 is a graph of the relationship between x and y for reducing the black luminance at the maximum in the case in which the extension axis 1601 of the retardation plate 160 is fixed in the reference direction, the absorption axis 2501 of the upper polarizer 250 is shifted by x from the reference direction, and the absorption axis 1501 of the lower polarizer 150 is shifted by y from the reference direction. In other words, FIG. 12 is a graph showing that in the case in which an equation $y=ax+90$ is held, what value of coefficient a reduces the black luminance. Here, coefficient a expresses the ratio of the amount of x to the amount of y. In FIG. 12, the value of coefficient a where the black luminance is reduced at the maximum is 0.9. Moreover, from FIG. 12, within the range of 0.9±0.09, it can be said that the black luminance can be sufficiently made smaller.

Figure 13:
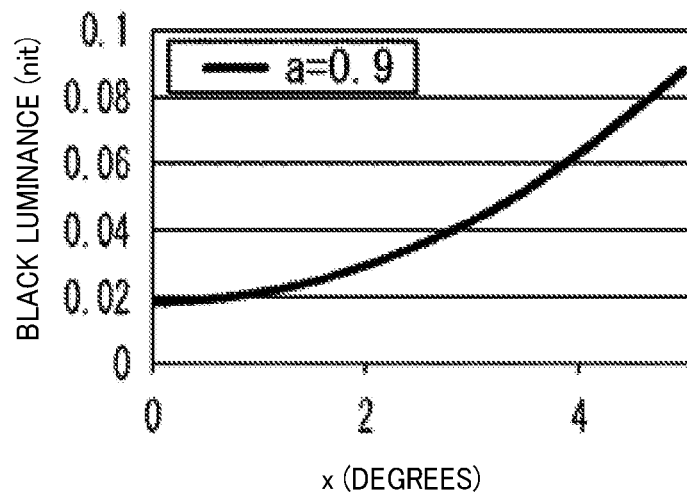
FIG. 13 is a graph of the relationship between a change in x and a change in the black luminance where coefficient a is set to 0.9 in the case in which the angle of the absorption axis of the upper polarizer is defined as x, the angle of the absorption axis of the lower polarizer is defined as y, and the upper and lower polarizers are rotated together in the equation y=ax+90.

FIG. 13 is a graph showing how the black luminance is changed in the case in which x is changed where a=0.9. In other words, this is a change in the black luminance in the case in which the value of x is changed as the extension axis 1601 of the retardation plate 160 is maintained at the reference position and the values of x and y are maintained in the equation y=ax+90. The black luminance in FIG. 13 is greatly improved more than in the case in FIG. 7, and slightly improved more than in the case of the expression (A+C) in FIG. 11. In FIG. 13, in the case in which x is three degrees, the black luminance is about 0.043 nit.

Figure 14:
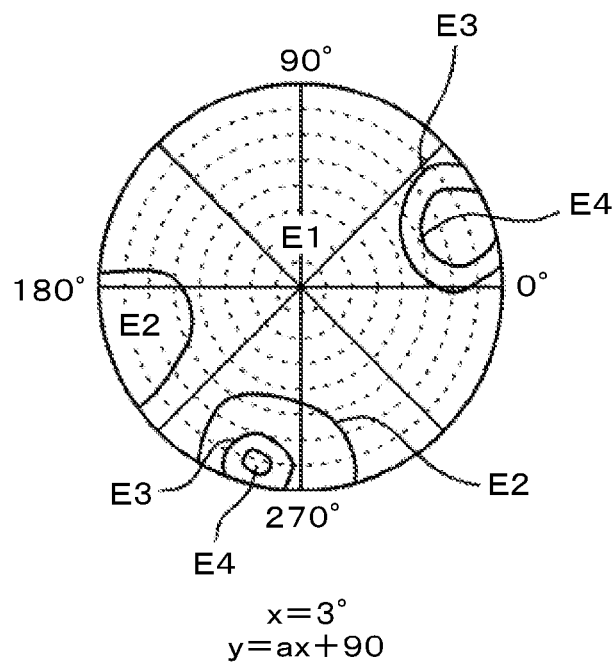
FIG. 14 is a chart of viewing angle characteristics where coefficient a is set to 0.9 and x=3 in the case in which the angle of the absorption axis of the upper polarizer is defined as x, the angle of the absorption axis of the lower polarizer is defined as y, and the upper and lower polarizers are rotated together in the equation y=ax+90.

FIG. 14 is a chart of the viewing angle characteristics in this case. In other words, FIG. 14 is a chart of the viewing angle characteristics in the case in which the extension axis 1601 of the retardation plate 160 is maintained at the reference angle, the absorption axis 2501 of the upper polarizer 250 is shifted by x from the reference direction, i.e., by an angle of three degrees, and the absorption axis 1501 of the lower polarizer 150 is in the equation y=ax+90. The definition of the viewing angle characteristics illustrated in FIG. 14 is similar to the definition described in FIG. 5 and the other diagrams.

As illustrated in FIG. 14, in the viewing angle characteristics in this case, in the case in which the angle from the normal direction of the screen is large, there are portions in which the viewing angle characteristics are degraded at a certain azimuth angle as compared with the previously existing examples. However, the portions having uniform viewing angle characteristics are expanded overall. In FIG. 14, the luminance is increased in order of luminances E1, E2, E3, and E4.

Figure 15:
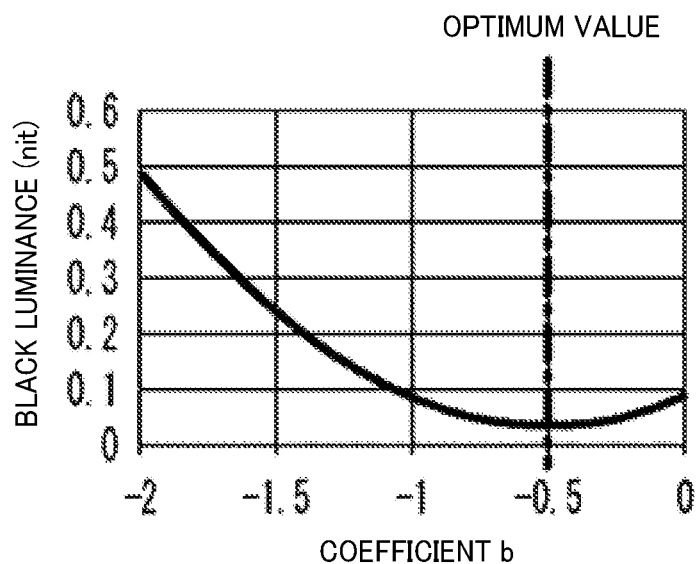
FIG. 15 is a graph of determining the optimum value for coefficient b in the case in which the angle of the absorption axis of the upper polarizer is defined as x, the angle of the extension axis of the retardation plate is defined as z, and the upper polarizer and the retardation plate are rotated together in an equation z=bx.

FIG. 15 is a graph of the relationship between x and z for reducing the black luminance at the maximum in the case in which the absorption axis 1501 of the lower polarizer 150 is fixed in the direction at an angle of 90 degrees from the alignment axis 1131, the absorption axis 2501 of the upper polarizer 250 is shifted by x from the reference direction, and the extension axis 1601 of the retardation plate 160 is shifted by z=bx from the reference direction. In other words, FIG. 15 is a graph showing that what value of coefficient b reduces the black luminance in the case in which an equation z=bx is held. Here, coefficient b expresses the ratio of the amount of x to the amount of z. In FIG. 15, the value of coefficient b where the black luminance is reduced at the maximum b is 0.5. From FIG. 15, when coefficient b is within the range of 0.5±0.05, it can be said that the black luminance can be sufficiently made smaller.

Figure 16:
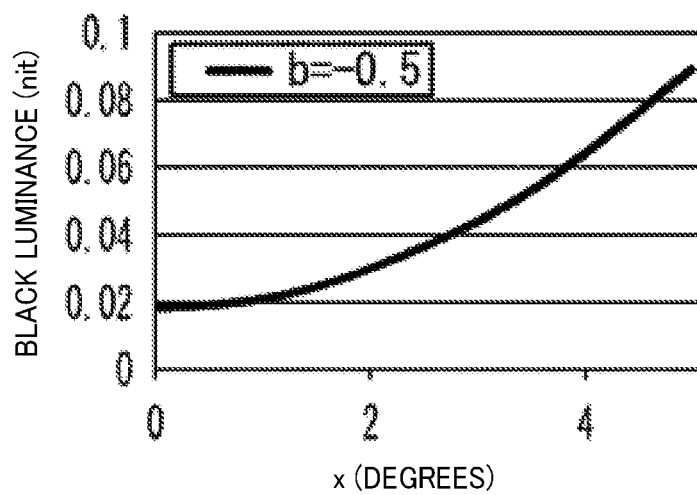
FIG. 16 is a graph of the relationship between a change in x and a change in the black luminance where coefficient b is set to 0.5 in the case in which the angle of the absorption axis of the upper polarizer is defined as x, the angle of the extension axis of the retardation plate is defined as z, and the upper polarizer and the retardation plate are rotated together in the equation z=bx.

FIG. 16 is a graph showing how the black luminance is changed in the case in which x is changed where b=0.5. In other words, this is a change in the black luminance in the case in which the value of x is changed as the absorption axis 1501 of the lower polarizer 150 is maintained at the reference angle and the value of z is maintained in the equation z=bx. The black luminance in FIG. 16 is greatly improved more than in the case in FIG. 7, and slightly improved more than in the case of the expression (A+C) in FIG. 11.

Figure 17:
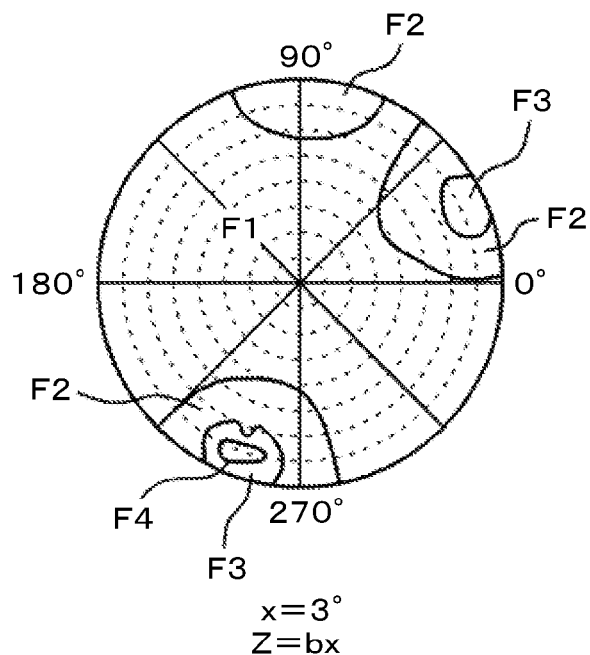
FIG. 17 is a chart of viewing angle characteristics where coefficient b is set to 0.5 and x=3 in the case in which the angle of the absorption axis of the upper polarizer is defined as x, the angle of the extension axis of the retardation plate is defined as z, and the upper polarizer and the retardation plate are rotated together in the equation z=bx.

In FIG. 16, in the case in which x is three degrees, the black luminance is about 0.043 nit. FIG. 17 is a chart of the viewing angle characteristics in this case. In other words, FIG. 17 is a chart of the viewing angle characteristics in the case in which the absorption axis 1501 of the lower polarizer 150 is maintained in the direction at an angle of 90 degrees from the alignment axis 1131, the absorption axis 2501 of the upper polarizer 250 is shifted by x from the reference direction, i.e., by an angle of three degrees, and the extension axis 1601 of the retardation plate 160 is set in the equation z=bx. The definition of the viewing angle characteristics in FIG. 17 is similar to the definition described in FIG. 5 and the other diagrams.

In FIG. 17, the luminance is increased in order of luminances F1, F2, F3, and F4. As illustrated in FIG. 17, in the viewing angle characteristics in this case, in the case in which the angle from the normal direction of the screen is large, there are portions in which the viewing angle characteristics are degraded at a certain azimuth angle as compared with the previously existing examples. However, the portions having uniform viewing angle characteristics are expanded overall.

Figure 18:
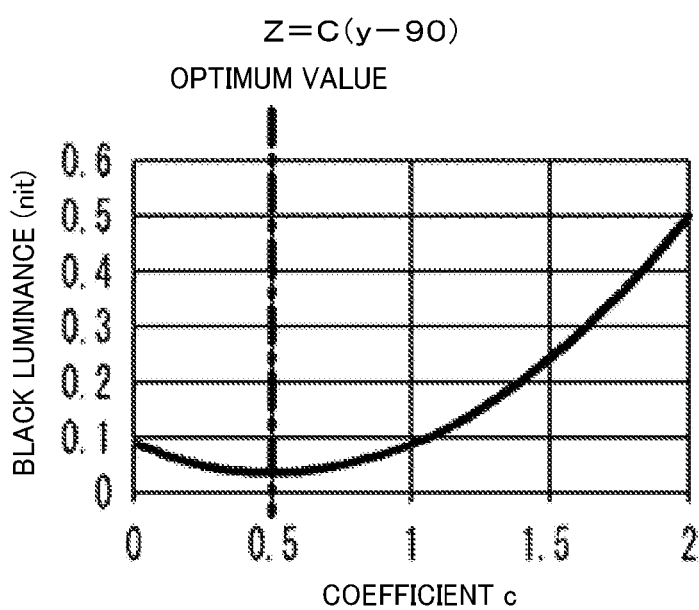
FIG. 18 is a graph of determining the optimum value for coefficient c in the case in which the angle of the absorption axis of the lower polarizer is defined as y, the angle of the extension axis of the retardation plate is defined as z, and the lower polarizer and the retardation plate are rotated together in an equation z=c(y−90)

FIG. 18 is a graph of the relationship between y and z for reducing the black luminance at the maximum in the case in which the absorption axis 2501 of the upper polarizer 250 is fixed in the reference direction, the absorption axis 1501 of the lower polarizer 150 is shifted by y from the reference direction, and the extension axis 1601 of the retardation plate 160 is shifted by z=c(y−90) from the reference direction. In other words, FIG. 18 is a graph showing that what value of c reduces the black luminance in the case in which an equation z=c(y−90) is held. Here, coefficient c expresses the ratio of the amount of y to the amount of z. In FIG. 18, the value of coefficient c is 0.5 where the black luminance is reduced at the maximum. From FIG. 18, when coefficient c is within the range of 0.5±0.05, it can be said that the black luminance can be sufficiently made smaller.

Figure 19:
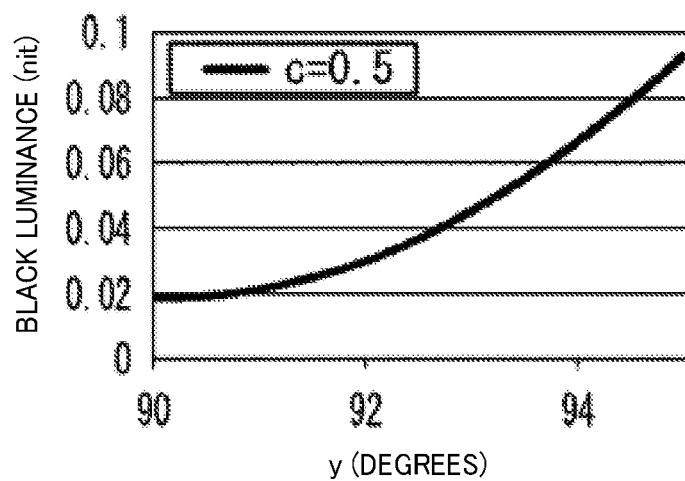
FIG. 19 is a graph of the relationship between a change in y and a change in the black luminance where coefficient c is set to 0.5 in the case in which the angle of the absorption axis of the lower polarizer is defined as y, the angle of the extension axis of the retardation plate is defined as z, and the lower polarizer and the retardation plate are rotated together in the equation z=c(y−90)

FIG. 19 is a graph showing how the black luminance is changed in the case in which y is changed where c=0.5. In other words, this is a change in the black luminance in the case in which the value of y is changed as the absorption axis 1501 of the lower polarizer 150 is maintained at the reference angle and the values of y and z are maintained in the equation z=c(y−90). The black luminance in FIG. 19 is greatly improved more than in the case in FIG. 7, and slightly improved more than in the case of the expression (A+C) in FIG. 11.

Figure 20:
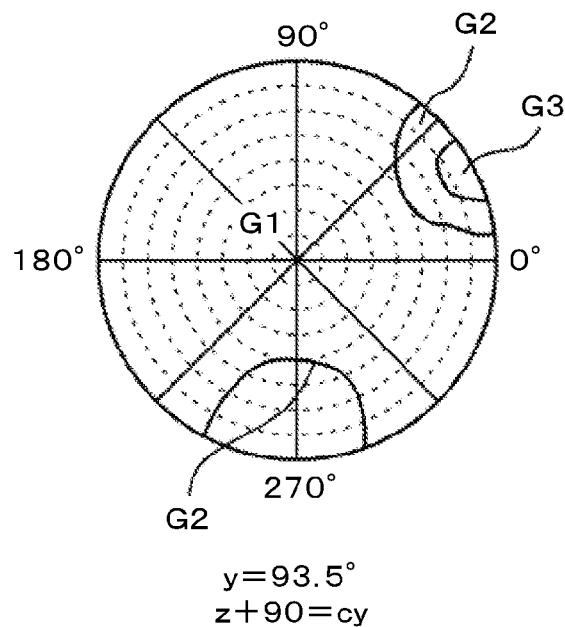
FIG. 20 is a chart of viewing angle characteristics where coefficient c is set to 0.5 and y=93.5 in the case in which the angle of the absorption axis of the lower polarizer is defined as y, the angle of the extension axis of the retardation plate is defined as z, and the lower polarizer and the retardation plate are rotated together in the equation z=c(y−90).

In FIG. 19, in the case in which y is an angle of 93.5 degrees, the black luminance is about 0.056 nit. FIG. 20 is a chart of the viewing angle characteristics in this case. In other words, FIG. 20 is a chart of the viewing angle characteristics in the case in which the absorption axis 2501 of the upper polarizer 250 is maintained in the reference direction, the absorption axis 1501 of the lower polarizer 150 is set to y from the reference direction, i.e., by an angle of 93.5 degrees, and the extension axis 1601 of the retardation plate 160 is set in the equation z=c(y−90). The definition of the viewing angle characteristics in FIG. 20 is similar to the definition described in FIG. 5 and the other diagrams.

As illustrated in FIG. 20, in the viewing angle characteristics in this case, in the case in which the angle from the normal direction of the screen is large, there are portions in which the viewing angle characteristics are degraded at a certain azimuth angle as compared with the previously existing examples. However, the portions having uniform viewing angle characteristics are expanded overall. In FIG. 20, the luminance is increased in order of luminances G1, G2, and G3.

As described above, in the FFS liquid crystal display device having the upper and lower polarizers and the retardation plate, any two of the absorption axis of the upper polarizer, the absorption axis of the lower polarizer, and the extension axis of the retardation plate are shifted from the reference position. Thus, the viewing angle characteristics can be improved as an increase in the black luminance is reduced within the tolerance.

It is noted that in FIG. 3 for explaining the FFS structure, the color filter is formed on the counter substrate. However, the embodiment of the present invention is also applicable to the case in which the color filter is formed on the TFT substrate.

In the description above, a so-called e-mode is used in the liquid crystal display device. However, the embodiment of the present invention is also applicable to the case of using a so-called o-mode. In the o-mode, the absorption axis 2501 of the upper polarizer 250 in FIG. 4 is at an angle of 90 degrees from the alignment axis 1131, the direction of the absorption axis 1501 of the lower polarizer 150 is similar to the direction of the alignment axis 1131 of the alignment film 113, and the extension axis 1601 of the retardation plate 160 is directed in the direction at an angle of 90 degrees from the alignment axis 1131. In the case in which the direction of the alignment axis 1131 is the reference angle, in the disposition as in FIG. 6, the upper polarizer 250 and the lower polarizer 150 are rotated together. In this case, the equation y=ax+90 is held, where the displacement of the absorption axis 2501 of the upper polarizer 250 from the reference angle is defined as x, and the angle of the absorption axis 1501 of the lower polarizer 150 from the alignment axis 1131 is defined as y. Moreover, in the case in which the upper polarizer 250 and the retardation plate 160 are rotated together, the equation z=bx is held, where the displacement of the absorption axis 2501 of the upper polarizer 250 from the reference angle is defined as x, and the displacement of the extension axis 1601 of the retardation plate 160 from the reference angle is defined as z. Furthermore, in the case in which the lower polarizer 150 and the retardation plate 160 are rotated together, the equation z=c(y−90) is held, where the displacement of the absorption axis 1501 of the lower polarizer 150 from the reference angle is defined as y, and the displacement of the extension axis 1601 of the retardation plate 160 from the reference angle is defined as z. The values of coefficients a, b, and c in this case are similar to the values described in the e-mode. In other words, the manner how the upper polarizer 250, the retardation plate 160, and the lower polarizer 150 are rotated together is the same in both of the e-mode and the o-mode.

What is claimed is:

1. A liquid crystal display device comprising:
 a liquid crystal display panel including:
  a first substrate on which a first electrode is formed on a second electrode through an insulating film and a first alignment film is formed on the first electrode; and
  a second substrate formed with a second alignment film;
 wherein a liquid crystal, sandwiched between the first substrate and the second substrate, is driven by an electric field generated between the first electrode and the second electrode,
 wherein an alignment axis of the first alignment film and an alignment axis of the second alignment film are directed in the same direction, and
 wherein an upper polarizer is disposed on the second substrate, a lower polarizer is disposed below the first substrate, a retardation plate is disposed between the lower polarizer and the first substrate or between the upper polarizer and the second substrate, and a voltage is applied across the first electrode and the second electrode for forming an image,
 wherein at least two of the upper polarizer, the lower polarizer, or the retardation plate satisfy any one of:
  a condition that an absorption axis of the upper polarizer forms an angle of one to 45 degrees inclusive with the alignment axis;
  a condition that an absorption axis of the lower polarizer forms an angle of 91 to 135 degrees inclusive or forms an angle of 45 to 89 degrees inclusive with the alignment axis; and
  a condition that an extension axis of the retardation plate forms an angle of one to 45 degrees inclusive with the alignment axis, and
 wherein the extension axis of the retardation plate and the absorption axis of the lower polarizer are not parallel.

2. The liquid crystal display device according to claim 1, wherein the retardation plate is disposed between the first substrate and the lower polarizer.

* * * * *